May 22, 1956 A. E. ANDERSON 2,746,121
CONDITIONING OF SEMICONDUCTOR TRANSLATORS
Filed Oct. 6, 1951

INVENTOR
A. E. ANDERSON
BY
ATTORNEY

United States Patent Office 2,746,121

Patented May 22, 1956

2,746,121

CONDITIONING OF SEMICONDUCTOR TRANSLATORS

Alva Eugene Anderson, Mountainside, N. J., assignor to Bell Telephone Laboratories, Incorporated, New York, N. Y., a corporation of New York Application October 6, 1951, Serial No. 250,160

15 Claims. (Cl. 29—25.3)

Figures 1, 2:
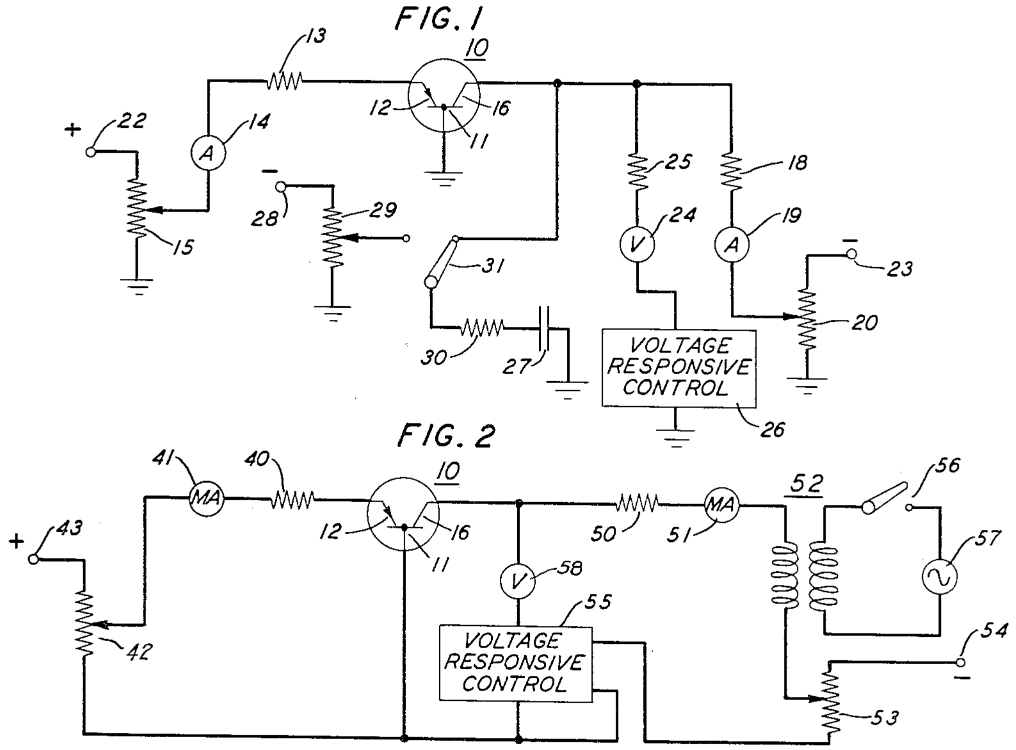

This invention relates to methods of and apparatus for improving the electrical characteristics of semiconductive translating devices of the type disclosed in Patent 2,524,035 granted October 3, 1950, to J. Bardeen and W. H. Brattain and more particularly to a method of electrically forming such devices.

Translating devices of the type to which this invention is applicable heretofore have been termed transistors. A transistor in one form comprises a body of semiconductive material having an ohmic connection, the base, to one portion thereof and at least one connection exhibiting non-linear conductivity and arranged so that an electric field generated by the injection of anomalous or minority charge carriers in the region of the non-linear connection, modifies the conduction characteristics of that region. One form of such a device as disclosed in the above-identified patent to which the forming process of this invention is particularly applicable comprises a semiconductive body having a large area ohmic connection forming the base and a pair of critically spaced restricted area connections, which may be point or line contacts, to the semiconductor surface, forming the emitter and collector connections. In such devices, the input may be connected between the base connection and the emitter connection and the output between the base connection and the collector connection.

Transistors which may be modulated by light falling on a semiconductor body in the region of a collector to generate or inject anomalous or minority charge carriers in that region are also known as exemplified by Patent 2,560,606 which issued July 17, 1951, to J. N. Shive. A method of forming light responsive translators is disclosed in the application of J. N. Shive, Serial No. 250,159, filed October 6, 1951, now Patent 2,676,228 which issued April 20, 1954.

Methods of improving the collector connection of transistors by electrical forming have been suggested heretofore. Such methods are disclosed in W. H. Brattain application Serial No. 67,781 filed December 29, 1948, now Patent 2,663,829 which issued December 22, 1953, and in W. G. Pfann application Serial No. 67,797 filed December 29, 1948, now Patent 2,577,803 which issued December 11, 1951. As set forth in those applications, certain advantages were obtained in forming triode semiconductor devices over the forming of semiconductor diodes such as point contact crystal rectifiers by subjecting one connection to a forming procedure while the other connection was connected to the base. In the processes of the above applications, the degree of forming effected was rather crudely observed as a trace on an oscilloscope. The collector connection was formed by applying a current through it in the reverse direction of conduction until its voltage-current characteristic was extended into the negative dynamic resistance region as indicated on an oscilloscope. While marked improvements were achieved in the electrical characteristics of individual units by these procedures, variations in the ease with which units formed, in individual operator's judgment from unit to unit in forming them to a standard oscilloscope trace, and in the skill and judgment of different operators resulted in substantial variations in transistor characteristics. Uniformity is necessary in any element to be incorporated in an extensive system; hence, selection with a high number of rejects, even of those units successfully formed, was experienced. Further, the dependence upon operator skill in forming resulted in the overforming or destruction of large numbers of units.

It has been noted that there is a point in the electrical conditioning of transistors beyond which detrimental effects are obtained. This excessive electrical conditioning, which has been termed overforming, can occur over a wide range and causes decays in electrical characteristics which extend from a slight decrease of collector reverse resistance resulting in a decrease in power gain, to destruction of the unit as a transistor. Heretofore no forming criteria had been established other than the forming of transistors to an oscilloscope trace indicating dynamic negative resistance in the collector-to-base circuit. Such a characteristic is believed to be caused by a thermal effect as a result of heating the region of the semiconductor. The energy necessary to produce sufficient heating to operate the unit in its dynamic negative resistance region may vary due to a great many factors and there does not appear to be a correlation between this result and the proper degree of forming for the production of the best units possible. The prior methods of forming, in addition to producing a wide scattering of characteristics in formed transistors, also gave low yields due to overforming.

One object of this invention is to improve the electrical forming of transistors. More specific objects are to increase the consistency of the formed characteristics of transistors, reduce the loss of transistors in the forming process, simplify the forming techniques for transistors, improve the controls available in the forming of transistors, and make the forming of transistors amenable to automatic controls.

A feature of this invention resides in forming the collector connection of a transistor by the application of electrical energy thereto while anomalous charge carriers are injected in the region of the connection and continuing the application of electrical energy to the connection until a predetermined voltage, the value of which is dependent on the density of anomalous charge carriers injected in the region of the collector connection, exists in the circuit of the connection. The terminating voltage value is chosen to lie in the region of collector current saturation for the unit.

Another feature resides in forming a collector connection by the application of electrical energy thereto while monitoring its voltage to the base and the currents flowing between it and the base and between an emitter and base connection until the collector voltage is at that value at which collector current saturation occurs for the emitter and collector currents which are flowing.

Another feature resides in forming a light responsive translator by the method disclosed in the above-noted application of J. N. Shive, wherein forming is effected by applying a relatively high intensity of light to the semiconductor body in the vicinity of the collector while forming energy is applied through the collector, and terminating the forming operation when the collector voltage has fallen to a predetermined value which depends on the density of light flux in the vicinity of the collector.

A further feature resides in forming of a collector-to-semiconductor connection by the application of energy to that region, monitoring the degree of forming by applying a collector-to-base voltage and an emitter current or a high light flux density in the vicinity of the connection, and terminating the application of forming energy when the collector voltage has decreased to a predetermined value which depends on the emitter current or light flux density.

Another feature resides in forming a transistor collector to a predetermined characteristic automatically, thereby eliminating the possibility of human error in this step. Automatic termination of the operation is attained by employing a control which is responsive to a predetermined collector-base voltage. In the case where constant quiescent currents are assured, the control is dependent for its actuation on the collector-base voltage alone, and where these currents are not fixed, it is dependent on the emitter current and the collector-base voltage.

In one embodiment, the collector connection may be formed by drawing a fixed emitter current in the forward direction of conduction, drawing a relatively high collector current in the reverse direction of conduction, and superimposing reverse pulses on the collector current until the collector voltage, when the unit is in its quiescent state, has dropped to that value at which collector current saturation occurs for the emitter and collector currents which are then flowing.

Figure 3:
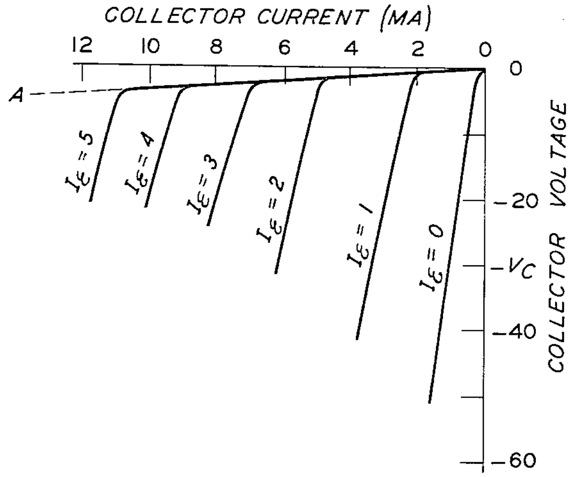

The above and other objects and features of this invention will be more readily understood from the following detailed description when read in conjunction with the accompanying drawing in which:

Fig. 1 represents a forming circuit for accomplishing the forming of transistors in accordance with this invention by the superposition of condenser discharges on the quiescent collector current;

Fig. 2 portrays another transistor forming circuit according to this invention wherein combinations of alternating and direct currents or alternating or direct current alone may be employed; and Fig. 3 is a typical collector characteristic of a transistor illustrating the saturation point for a number of emitter currents.

In the drawings simplified forming circuits have been depicted in schematic form. Since the criteria as to the degrees of forming achieved by this invention are voltages and currents which may be either fixed or correlated in readily ascertainable manners, forming processes as taught here are readily amenable to voltage and current sensitive automatic controls. Therefore, it is to be understood that the substitution of voltage and current sensitive controls as are well known in the art for adjusting voltages and currents, or connecting or disconnecting energy sources are within the concept of this invention.

In applying the forming method of this invention to a group of transistors which have been manufactured, with an aim of uniformity from unit to unit, it is first necessary to establish the optimum formed characteristics to be expected. This may be done conveniently by empirical methods in a circuit of the type disclosed in Fig. 1 by alternately applying forming energy and observing the direct-current values on the collector at two operating points. One of these points is the collector-to-base voltage and current with no emitter current and sufficient collector current in the reverse direction to assure operation outside the non-linear region around the origin of the collector characteristic as shown on Fig. 3. These values define the collector-to-base resistance, which should be high. The other point is the collector-to-base voltage and collector current at some value of emitter current. Optimum values can be set for these points and when such values are reached a collector characteristic such as that shown in Fig. 3 can be constructed. Alternatively the optimum collector characteristic can be determined by applying slight increments of forming energy until the unit is carried beyond the optimum condition and constructing the collector characteristic after each application of energy, the best characteristic can then be chosen from those constructed. Having obtained a predicted characteristic for the remaining units of the group, forming is effected by applying energy to the collector until the collector voltage is at or within a predetermined range of that value at which, according to the predicted characteristic, collector current saturation occurs for the emitter current flowing. This value is chosen somewhere beyond the initial bending of the emitter current curves, i. e., at some voltage less negative than that at the initial portion of the emitter current knee. It is to be noted that a decrease of collector voltage is absolute and that actually it is an increase from one negative value to another less negative.

As may be seen from Fig. 3, collector current saturation for various values of emitter current is to a first order approximation a straight line A—O with a relatively flat slope; in most instances its slope falls between about 100 and 300. It has been found that forming to any point along this collector current saturation line A—O gives a unit of a group a uniform characteristic within as close tolerance of other units of the group as are now obtained in the manufacture of vacuum tubes. Hence, in manufacturing uniform units the forming limits are not fixed but exist in a range and thus lend themselves to a number of forming methods.

One method of forming according to this invention comprises drawing a constant emitter current in the forward direction, drawing a constant collector current in the reverse direction, superposing condenser discharges of increasing energies in the reverse direction of conduction on the constant collector current, and intermediate the condenser discharges observing the quiescent collector-to-base voltage. When the quiescent collector-to-base voltage reaches a predetermined value which depends on the emitter current and corresponds to collector current saturation the unit may be considered formed. It is also possible to form as above with only the emitter current held constant.

The rectitation of specific voltage, current, and resistance values requires consideration of a transistor having certain of its factors defined; thus in the following discussion the transistor being formed has these characteristics: the semiconductor body is of N-type germanium having a resistivity of 4 ohm-centimeters, the emitter contact is a shear pointed 5 mil wire of beryllium copper and is spaced on the germanium surface 2 mils from a shear pointed 5 mil Phosphor bronze wire collector.

Forming as described to obtain the predicted collector characteristic and according to the above method can be conveniently effected in a circuit of the type shown in Fig. 1. In this circuit, a transistor 10 has its base connection 11 grounded, its emitter connection 12 connected through a series resistance 13 and a milliammeter 14 to a potentiometer 15, and its collector connection 16 connected through a series resistance 18 and a milliammeter 19 to potentiometer 20. Potentiometers 15 and 20 each have one terminal grounded and the other connected to a suitable source 22 and 23, respectively, and each can be arranged to automatically maintain the currents they supply at desired values. Constant current can also be obtained by employing a high impedance source. A voltmeter 24 connected through resistor 25 is provided for determining the quiescent collector voltage. Voltage responsive control apparatus 26 can be included in the circuit from the collector to ground so that it causes the removal of the transistor from the circuit when it has been formed as indicated by the magnitude of the collector-to-base voltage.

In the collector characteristic shown in Fig. 3 the current saturation line A—O has a substantial slope. Therefore, it is desirable that the voltage sensitive control be correlated with the emitter current to operate on the collector current saturation curve so that forming ceases at more negative collector voltages for higher emitter currents and less negative collector voltages for lower emitter currents. Voltage sensitive control means 26 which are correlated with a current in the above manner can be constructed by those skilled in the art.

Forming may be effected in the circuit of Fig. 1 by establishing constant quiescent emitter and collector currents, by employing high impedance sources or by keeping the currents constant through readjustment of the potentiometers. Short pulses of energy are then applied to the collector by superposing them on the collector current in the reverse direction of conduction from a condenser discharge. One means of applying these discharges is by charging a condenser 27, having one side grounded, from a source 28, through a potentiometer 29 and a series resistor 30 by closing a switch 31 to the source, and then connecting it to the collector circuit by means of switch 31 to discharge it. The amount of extra forming energy required to raise the individual units of some batches to a point on the current saturation line varies and, therefore, it is desirable that a method and means for increasing the forming energy be provided. The charging voltage for condenser 27 can be increased gradually by adjusting the potentiometer 29, the condenser 27 can be increased in size and the series limiting resistor 30 can be decreased to increase the forming energy of the superposed pulses.

A typical forming operation for a transistor constructed with the physical characteristics outlined above having a collector-to-base voltage of the order of −100 volts with a collector current of −2 milliamperes and an emitter current of zero, $V_{c0}$, and a collector-to-base voltage of from −40 volts to the value of $V_{c0}$ when the collector current is −2 milliamperes and the emitter current is 1 milliampere, $V_{c1}$, follows: source 22 may be at +350 volts to ground and sources 23 and 28 at −350 volts to ground. All potentiometers have a total resistance to ground of 100,000 ohms. Resistor 13 is of 100,000 ohms and resistor 18 is 50,000 ohms. The circuit is adjusted so the unit draws a 1 milliampere emitter current and a −2 milliampere collector current. Potentiometer 29 is adjusted to −100 volts and capacitor 27 (0.25 microfarad) is discharged through the series resistor 30 of 2200 ohms and the collector. The capacitor charging voltage is increased progressively until the collector voltage $V_{c1}$ at the quiescent currents specified falls to the current saturation curve, about −4 volts or less. In the event that the unit does not form completely with the condenser charged to 350 volts, the series resistor 30 may be decreased to 1200, 560, and 330 ohms and the discharge voltage series run through at each value until forming occurs.

It is to be understood that the above forming procedure is exemplary only and that different end points might be chosen on the collector current saturation line for units of the above type. Further, units which have been constructed differently, i. e., with different semiconductive material, different contact material, or different contact areas, spacings, or pressures, would be expected to have a different predicted characteristic to which they would be formed.

Forming may also be done according to this process without adjusting the circuit parameters to provide constant emitter and collector currents. For example, a circuit may be set up to apply emitter and collector currents of magnitudes lying within rather wide limits and additional reverse energy might be applied to the collector until the quiescent collector voltage reached a value which, at the emitter current then flowing, was at the collector current saturation line and thus indicated the completion of forming according to this invention.

The preceding disclosure has been directed to condenser discharge pulse forming. It is to be understood, however, that the invention is not so limited and that other forms of electrical treatment including the application of pulse and continuous quantities of energy of either a direct or alternating nature or combinations thereof are suitable in forming transistors to the desired characteristics. Fig. 2 shows a circuit from which such combinations of forming energy as have been suggested may be applied to a transistor unit in forming it. The transistor 10 has its emitter 12 connected to its base 11 through a series resistor 40 and a milliammeter 41 through potentiometer 42 to a positive voltage source 43. The collector 16 is connected to the base 11 through a series resistor 50, a milliammeter 51, a series combination of the secondary winding of transformer 52, potentiometer 53 connected to negative voltage source 54 and control means 55 which is responsive to the collector-to-base voltage. The primary winding is connected through switch 56 to source 57 which can supply variable alternating-current saw-tooth waves or pulses of alternating current. A voltmeter 58 and voltage responsive control 55 are connected between the collector and base.

One method of forming a transistor in the circuit of Fig. 2 by the method of this invention comprises applying the desired emitter current, setting the direct-current source so that the collector current is at some value near that at which forming occurs, then applying the alternating-current source, and gradually increasing the amount of alternating current flowing until forming occurs as indicated by a reduction of the collector-to-base voltage to the value corresponding to predicted collector current saturation for the emitter current flowing. Again automatic controls can be applied to this forming circuit so that the alternating component of the applied collector energy is gradually increased as with stepping switches while the emitter current and collector voltage are monitored and the operation ceases at the proper time.

While the above forming processes have employed electrical forming energy and have been applied to translators having emitter connections this invention is not restricted to either of these features. Rather forming, which is believed to be a change of conductivity and conduction type in that region of the semiconductor body under the collector connection, may be done with heat or other means. The control of forming by any of these other methods could then be effected by monitoring the collector-to-base voltage and emitter current by applying sampling biases to the unit either continuously or intermittently during the forming operation. Further, in the case of light responsive translators the monitoring of the collector-to-base voltage and the light flux density in the vicinity of the collector is effective. A characteristic similar to that of Fig. 3 exists for properly formed light responsive translators, light flux density being substituted for emitter current. In present units it has been found that $I_e\alpha \approx KL$, where $I_e$ is emitter current, $\alpha$ is the ratio of the change in collector current to the change in emitter current at a constant collector voltage, K is a constant of about 0.05 milliampere per millilumen and L is millilumens on an area having a radius of about 10 mils around the collector connection. Thus the light responsive units are formed to a predetermined collector voltage at the light intensity incident on the collector region, the light intensity being at least ten times ordinary room light or of the order of a millilumen per square millimeter.

It is to be understood that the above-described arrangements are illustrative of the application of the principles of the invention. Numerous other arrangements may be devised by those skilled in the art without departing from the spirit and scope of the invention.

What is claimed is:

1. The method of electrically forming a transistor to improve its electrical characteristics, said transistor having a semiconductor body, an ohmic base connection to said body, and a non-linear collector connection to said body, which comprises applying forming energy to the semiconductor body in the vicinity of the collector connection, monitoring the collector-to-base voltage while anomalous charge carriers are injected into the region being formed, and terminating the forming operation when the collector-to-base voltage has fallen to a predetermined value which is dependent on the density of anomalous charge carriers injected into the region being formed.

2. The method of electrically forming a transistor to improve its electrical characteristics, said transistor comprising a semiconductor body and base, emitter, and collector connections thereto which comprises passing current through the emitter connection, passing current through the collector and base connections, increasing the collector current until the collector-to-base voltage decreases to that value at which collector current saturation occurs at the emitter current flowing.

3. The method of electrically forming a light responsive translator to improve its electrical characteristics, said light responsive translator having a semiconductor body, an ohmic base connection to said body, and a non-linear collector connection to said body, which comprises applying forming energy to the semiconductor body in the vicinity of the collector connection, monitoring the collector-to-base voltage while a light density at least ten times normal room light falls on the surface of the body in the region being formed, and terminating the forming operation when the collector-to-base voltage has fallen to a predetermined value which is dependent on the incident light flux density.

4. The method of electrically forming a transistor to improve its electrical characteristics, said transistor comprising a semiconductor body and base, emitter, and collector connections thereto which comprises passing current through the body between the emitter and base connections, passing current in the direction of high resistance through the collector and base connections, superimposing pulses of energy in the high resistance direction on the collector current until the collector voltage in the quiescent state has declined to that value at which collector current saturation occurs at the value of the emitter current flowing.

5. The method of electrically forming a transistor to improve its electrical characteristics, said transistor comprising a semiconductor body and base, emitter, and collector connections thereto which comprises passing a constant current through the body between the emitter and base connections, passing current in the direction of high resistance through the collector and base connections, superimposing reverse pulses of energy on the collector current until the collector-to-base voltage in the quiescent state has declined to that value at which collector current saturation occurs at the emitter current flowing.

6. The method of electrically forming a transistor to improve its electrical characteristics, said transistor comprising a semiconductor body and base, emitter, and collector connections thereto which comprises passing a constant current through the body between the emitter and base connections, passing a constant current in the direction of high resistance through the collector and base connections, increasing the current flowing in the direction of high resistance through the collector and base connections until the collector-to-base voltage decreases to that value at which collector current saturation occurs for the value of the emitter current flowing.

7. The method of electrically forming a transistor to improve its electrical characteristics, said transistor comprising a semiconductor body and base, emitter, and collector connections thereto which comprises passing a constant quiescent current through the body between the emitter and base connections, passing a constant quiescent current in the direction of high resistance through the collector and base connections, superimposing pulses of energy in the direction of high resistance on the collector current until the quiescent voltage declines to that value at which collector current saturation occurs at the emitter current flowing.

8. The method of electrically forming a transistor to improve its electrical characteristics of transistor comprising a semiconductor body and base and collector connections thereto, which comprises injecting anomalous charge carriers into the semiconductor body of the transistor in the region of its collector connection, passing current through the collector and base connections, and applying additional electrical energy to the collector connection until the collector-to-base voltage decreases to that value at which collector current saturation occurs at the density of injected anomalous charge carriers then present in the region of the collector.

9. The method of electrically forming a transistor to improve its electrical characteristics, said transistor comprising a semiconductor body and base and collector connections thereto, which comprises injecting anomalous charge carriers into the semiconductor body of the transistor in the region of its collector connection, passing current in the direction of high resistance through the collector and base connections, and superposing pulses of electrical energy in the direction of high resistance on the collector current until the collector-to-base voltage in the quiescent state has declined to that value at which collector current saturation occurs at the density of injected anomalous charge carriers then present in the region of the collector connection.

10. The method of electrically forming a transistor to improve its electrical characteristics, said transistor comprising a semiconductor body and base, emitter, and collector connections thereto which comprises passing current through the emitter connection, passing current through the collector and base connections, increasing the collector current, and automatically interrupting said collector current by means responsive to said emitter current and collector voltage when said voltage has declined to a value corresponding to that at which collector current saturation occurs at the emitter current flowing.

11. The method of electrically forming a transistor to improve its electrical characteristics, said transistor comprising a semiconductor body and base, emitter, and collector connections thereto which comprises passing a constant current through the body between the emitter and base connections, passing a constant current in the direction of high resistance through the collector and base connections, increasing the current flowing in the direction of high resistance through the collector and base connections, and automatically interrupting the collector current by means responsive to the collector-to-base voltage when it has decreased to a predetermined value equal to that at which collector saturation occurs at the emitter current flowing.

12. The method of electrically forming a transistor to improve its electrical characteristics, said transistor comprising a semiconductor body and base, emitter, and collector connections thereto which comprises passing a constant current through the body between the emitter and base connections, passing current in the direction of high resistance through the collector and base connections, superimposing reverse pulses of energy on the collector current, and automatically interrupting the collector current by means responsive to the collector-to-base quiescent voltage when it has decreased to a predetermined value corresponding to collector current saturation at the emitter current flowing.

13. The method of electrically forming a transistor to improve its electrical characteristics, said transistor comprising a semiconductor body and base, emitter, and collector connections thereto which comprises passing a constant quiescent current through the body between the emitter and base connections, passing a constant quiescent current in the direction of high resistance through the collector and base connections, superimposing pulses of energy in the direction of high resistance on the collector current, and automatically interrupting the collector current by means responsive to the quiescent collector-to-base voltage when it has decreased to a predetermined value corresponding to collector current saturation at the emitter current flowing.

14. The method of electrically forming a transistor to improve its electrical characteristics, said transistor comprising a semiconductor body and base, emitter, and collector connections thereto which comprises passing current through the body between the emitter and base connections, passing current in the direction of high resistance through the collector and base connections, superimposing pulses of energy in the high resistance direction on the collector current, and automatically interrupting the collector current by means responsive to the quiescent collector-to-base voltage when it has decreased to a predetermined value corresponding to collector current saturation at the emitter current flowing.

15. The method of electrically forming a transistor to improve its electrical characteristics which comprises injecting anomalous charge carriers into the semiconductor body of the transistor in the region of its collector connection, passing current through the collector and base connections in the direction of high resistance, applying additional electrical energy in the direction of high resistance to the collector connection, and automatically interrupting the collector current by means responsive to the collector-to-base voltage when it has decreased to a value corresponding to collector current saturation at the density of injected anomalous charge carriers then present in the region of the collector connection.

References Cited in the file of this patent

UNITED STATES PATENTS

| | | |
|---|---|---|
| 1,563,557 | Coblentz | Dec. 1, 1925 |
| 2,510,322 | Shearer | June 6, 1950 |
| 2,524,035 | Bardeen et al. | Oct. 3, 1950 |
| 2,577,803 | Pfann | Dec. 11, 1951 |
| 2,666,977 | Pfann | Jan. 26, 1954 |
| 2,669,004 | Blair | Feb. 16, 1954 |